Jan. 24, 1950 J. F. LANGAN 2,495,528
PROJECTING AND VIEWING DEVICE FOR CARDS
WITH MICROFILM AND THE LIKE
Filed March 18, 1947 3 Sheets-Sheet 1

INVENTOR
John F. Langan
BY
Pennie, Edmonds, Morton & Barrows
ATTORNEYS

Jan. 24, 1950     J. F. LANGAN     2,495,528
PROJECTING AND VIEWING DEVICE FOR CARDS
WITH MICROFILM AND THE LIKE
Filed March 18, 1947     3 Sheets-Sheet 2
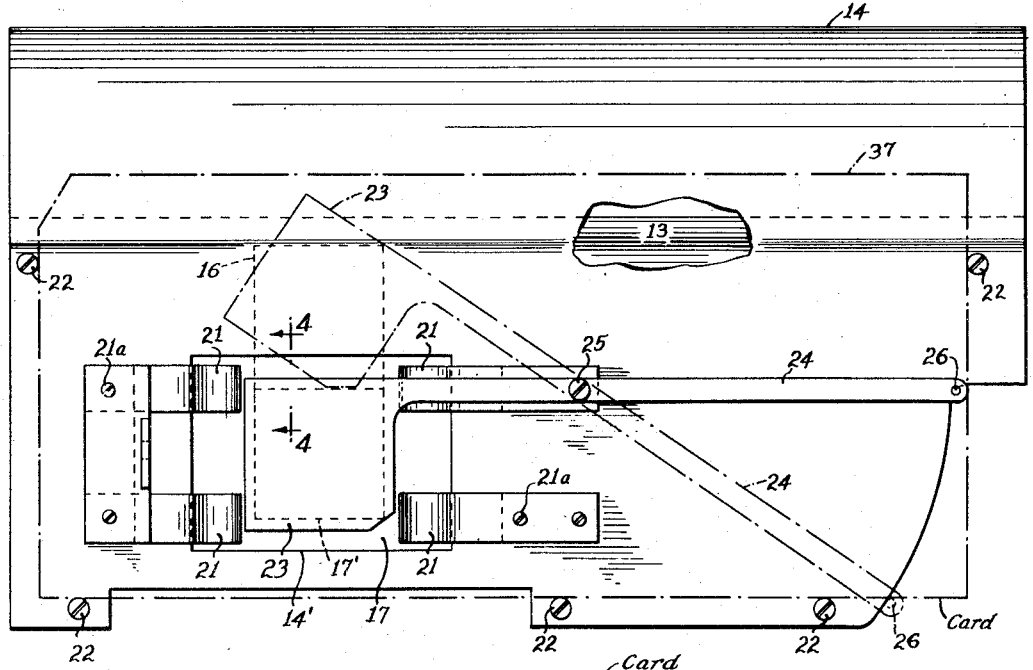
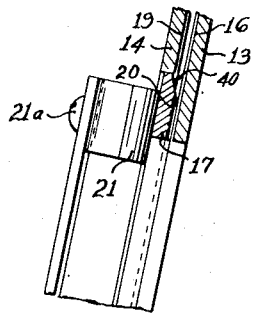
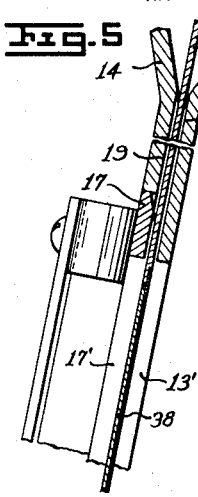
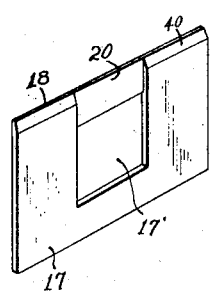
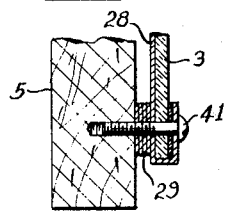
INVENTOR
John F. Langan
BY
ATTORNEYS Jan. 24, 1950 J. F. LANGAN 2,495,528
PROJECTING AND VIEWING DEVICE FOR CARDS
WITH MICROFILM AND THE LIKE
Filed March 18, 1947 3 Sheets-Sheet 3
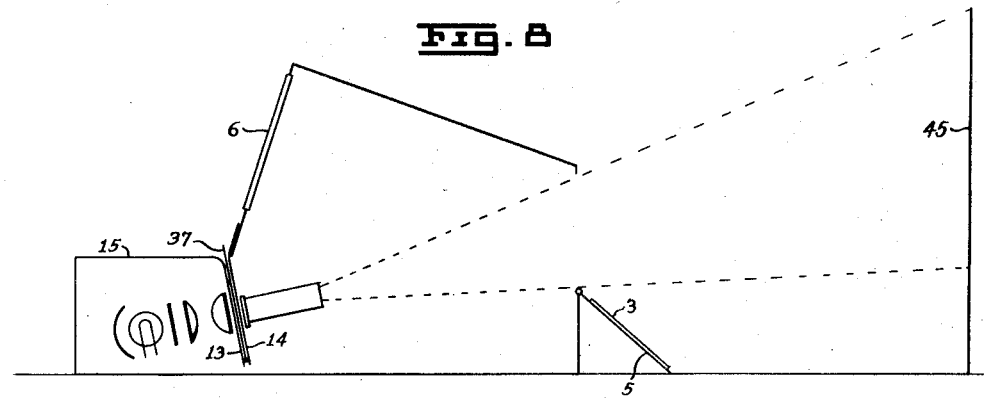
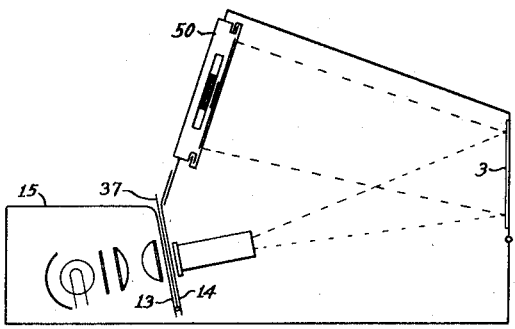
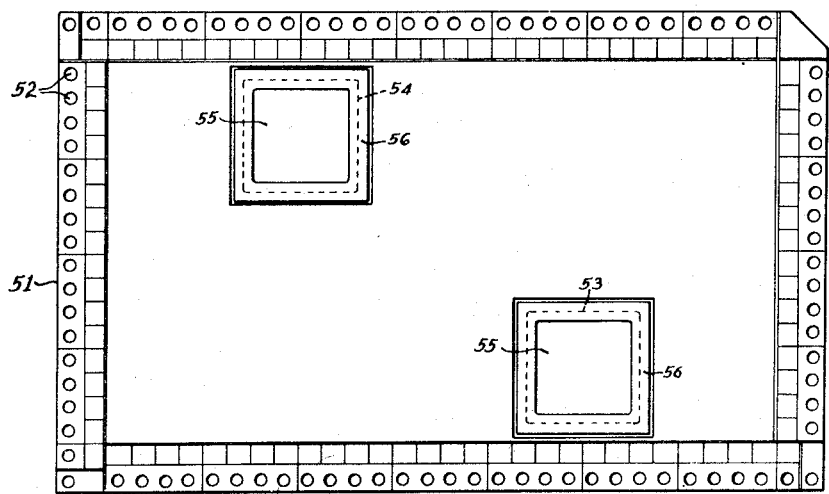
INVENTOR
John F. Langan
BY
Pennie, Edmonds, Morton & Barrows
ATTORNEYS Patented Jan. 24, 1950

2,495,528

UNITED STATES PATENT OFFICE 2,495,528

PROJECTING AND VIEWING DEVICE FOR CARDS WITH MICROFILM AND THE LIKE

John F. Langan, White Plains, N. Y., assignor, by mesne assignments, to Film 'N File, Inc., New York, N. Y., a corporation of Delaware Application March 18, 1947, Serial No. 735,285

12 Claims. (Cl. 88—24)

This invention relates to an improved apparatus for projecting, enlarging, and viewing or reproducing, microfilms and the like mounted in cards, such as classification cards.

The apparatus of the present invention is intended and adapted for use in projecting and enlarging microfilms and the like mounted in cards so that they can be readily viewed, and so that they may be reproduced in an enlarged form where this is desired.

The cards which are used in the improved apparatus of the present invention are cards, such as classification cards, with one or more openings therein and with a microfilm or the like in each such opening held therein by thin adhesive sheets, as described for example in my prior application Serial No. 638,785. Such cards have a thickness, e. g., of around 0.007 inch or somewhat more or less and can be readily punched for classification and used in standard machines for punching, sorting, classifying and selecting the cards in accordance with the system of classification used. Such cards have one or more openings therein and each opening contains a microfilm or similar film containing the material recorded thereon in a greatly reduced form. By projecting and enlarging such films, the original subject matter thereon can be reproduced of a size sufficient for ready reading or for reproduction photographically in a readily legible form.

The present invention is intended particularly for use in enabling such cards to be readily viewed and their subject matter read; and to enable a large number of such cards to be successively projected and enlarged and read or viewed, so that selection of one or more cards can readily be made.

The improved apparatus is so constructed that the user can insert the cards with a minimum of trouble and inconvenience and can similarly read or view the card in its projected and enlarged form.

The apparatus of the present invention also provides for similarly enlarging and reproducing the subject matter of the miniature films when this is desired.

According to the present invention, a projecting and enlarging apparatus is provided with special holding means for holding the cards to be viewed or reproduced and to enable them to be held in proper position while so projected and viewed or reproduced.

The present invention also provides an improved apparatus in which the light used for projecting is automatically cut off by a movable shutter when a card is removed from the apparatus, and the shutter opened when another card is inserted, thus enabling the light to be effectively used without turning it on or off, and protecting the viewer from the projecting action of the light when nothing is being projected.

The invention also provides an improved viewer in which the enlarged projection of the film may be viewed either on a screen conveniently arranged in front of the operator or projected onto a wall at a distance from the operator.

The invention includes various improved features and combinations of features which will be further described in connection with the accompanying drawings illustrating certain embodiments thereof; but it is intended and will be understood that the invention is illustrated thereby but is not limited thereto.

In the accompanying drawings—

Fig. 3 is an enlarged view, with parts broken away, showing the card holding devices from the back, as indicated generally by the line 3—3 of Fig. 2;

Fig. 4 is an enlarged detail of part of the card holding devices taken on the line 4—4 of Fig. 3;

Fig. 5 is a similar view with a card inserted in the holder;

Fig. 6 shows in perspective the yieldable spring-pressed plate forming part of the card holder;

Fig. 7 is an enlarged sectional view taken on the line 7—7 of Fig. 1;

Fig. 8 is a diagrammatic or schematic view illustrating one method of operation of the apparatus with projection of the film on the wall at a distance from the viewer;

Fig. 9 is another schematic or diagrammatic view illustrating the use of the viewer for printing enlargements of the film on sensitized photographic paper; and Fig. 10 shows a modified form and shape of card for use in the apparatus.

Figure 1:
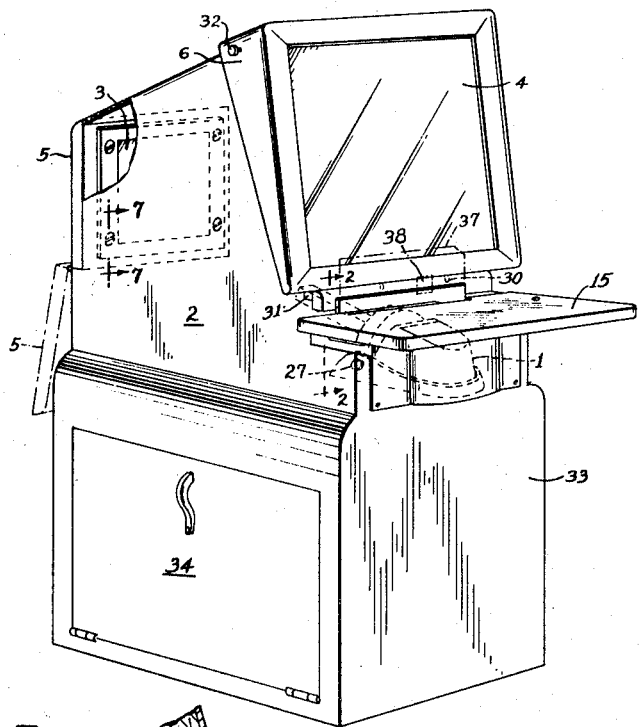
Fig. 1 shows a floor model of the apparatus in perspective, with part broken away.

The apparatus illustrated in Fig. 1 is a floor model in which the housing 2 for the viewer is mounted on and supported by a lower structure 33 with door 34 thereon, the lower part of the apparatus serving as storage space, and supporting the viewer at a convenient level for use by the operator while in a sitting position.

The apparatus includes a suitable projector indicated generally at 1 at the front of the viewer. The viewer housing 2 is light-tight and at the rear there is adjustably mounted a front surface mirror 3, while at the front of the viewer and at a height readily viewed by the operator is a translucent screen 4. The screen 4 is mounted in a frame 6 which is adjustable.

The rear view mirror 3 is mounted on a hinged door 5 so that, when the door 5 is opened to the position shown in broken lines in Fig. 1, the projector will project out through this opening onto a wall or screen located at a distance, thus giving a greatly enlarged view of the film projected. When the hinged door 5 is closed, the mirror 3 will act as a reflecting mirror, so that the image will be reflected onto the translucent screen 4.

The projecting unit shown generally at 1 may include the usual elements of such a projecting unit such as a set of condensing lenses 7, a light 8 with reflector back of it, and adjustable focusing lens units indicated generally at 9 held in the lens mount 10. A system of prisms is indicated at 11 to permit inverting of the image where the film would otherwise be projected onto the screen in an inverted position, or to permit the image to be rotated through 90° where this is desirable. The system of prisms 11 when used is conveniently supported by brackets mounted on the lens mount 10. A conventional blower is shown at 12 for cooling the film and surrounds parts of the apparatus.

Special provision is made for inserting the cards containing the film to be viewed and for insuring that the card and film are held in proper position for viewing. A pair of card receiving plates 13 and 14 is provided, spaced apart slightly more than the thickness of the film record card and fastened together at their sides and bottom and supported as a unit by brackets 35 attached to the light housing 1. This card holding unit is shown in side elevation in Fig. 2 and from the rear in Fig. 3.

At the front of the viewer and at a convenient level for the operator is a working table or shelf 15 secured to the housing 2 by brackets 36. This working table enables a pile of cards to be viewed to be supported thereon as well as the cards or pile of cards that have been viewed. The arrangement of the card holder at the back of this working table enables the operator to remove a card from the pile and insert it in the card holder, the location of the card as it is about to be inserted being shown in broken lines in Fig. 1; this card, indicated at 37, having a microfilm 38 therein and being a punched card, such as is used in mechanical sorting and classifying systems of the International Business Machine Corp. and the Remington Rand Co.

Figure 2:
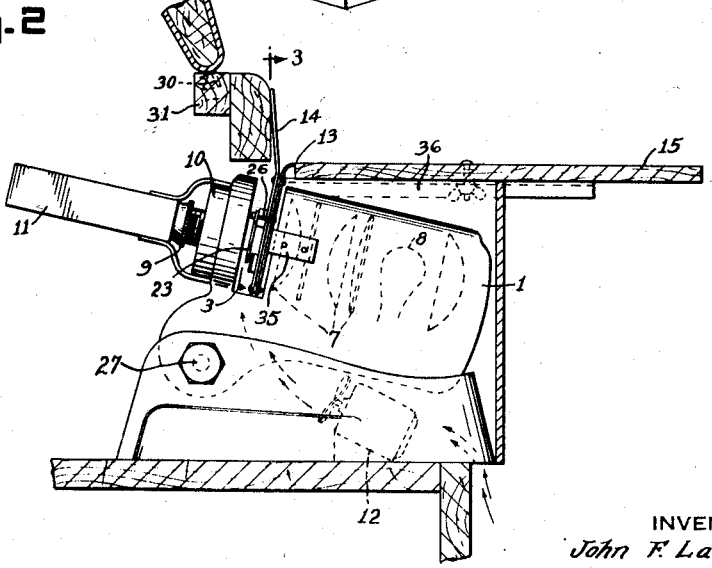
Fig. 2 is a partial section and partial elevation taken on the line 2—2 of Fig. 1.

It will be seen that the top of the front plate 13 of the card holder is even with and adjacent to the back end of the working table or shelf 15 and that the upper end of the back card holder 14 extends upwardly somewhat, and that these ends are spaced apart to facilitate insertion of the card between them. The card holding members in assembled position and separated from the rest of the apparatus are shown in Fig. 3 in rear view and with a card 37 therein shown in broken lines. The card receiving plates 13 and 14 are secured together by screws or bolts 22 and these plates are held spaced apart by spacing elements between them, as indicated in Fig. 2. The securing devices 22 at the ends of the plates serve as stops or limiting members for the ends of the cards and insure that the card will be properly centered when it is inserted between them. The fastening devices 22 at the bottom of the plates serve a similar purpose of supporting the card when it is fully inserted and insuring that it is properly located for projection. The front plate 13 has an opening 13' arranged at a location corresponding to that of the film in the card so that light may pass therethru. The back card holding member 14 has a somewhat larger opening 14' therein, and inside this opening is a smaller plate 17 having an opening 17' therein corresponding to the opening 13' in the front plate 13 and similarly located. This inserted plate 17 is held in place by springs 21, these springs being secured to the back plate 14 at 21a and with their free ends extending over the edges of the plate 17 and pressing it against the front plate 13 into the position indicated in Fig. 4. The upper and inner edge of this spring-pressed plate 17 is beveled, as indicated at 40, so that when a card is inserted between the plates 13 and 14 and is pushed downwardly, it will force the spring-pressed plate 17 away from the front plate 13 and permit the card to pass downwardly therebetween while at the same time holding the card yieldably against the front plate 13 to insure that the film will be in proper focal plane for projection.

At the portions of the plates 13 and 14 where the film in the card enters between the plates, a slight depression or channel is formed of about ten one-thousandths of an inch in depth, as indicated in dotted lines at 16 in Fig. 3 and as indicated at 16 and 19 in Figs. 4 and 5. A similar channel 20 is formed in the spring-pressed plate 17. The provision of these channels prevents or minimizes the danger of scratching of the film as it is inserted between the card holding members. Ordinarily the surface of the film will not project outwardly on either side beyond the surrounding outer surface of the card, and may be slightly lower than the surrounding card surface on one or both sides. But the provision of the channels in the card-receiving plates at a position corresponding to that at which the film is located in the card further protects the film from scratching or injury while the card is being inserted or withdrawn.

Special provision is made for shutting off the light from the projecting and viewing screen when the cards are withdrawn and for again making the light effective when a new card is inserted. A special shutter is provided which, as shown, consists of the shutter plate 23 mounted on one end of the arm 24 which is pivotally supported by the back plate 14 at 25; the other end of the arm 24 being provided with a projecting pin 26. When there is no card inserted in the card holding device, this shutter and supporting arm will be in the position shown in full lines in Fig. 3. When a card is inserted, the lower edge of the card at one end will push the pin 26 down to the position shown in broken lines in Fig. 3 and the shutter plate 23 will be raised to the position shown in broken lines, so that the light can pass through the film and project the film. When the card is withdrawn, the weight of the shutter plate 23 will cause it to be lowered and the projecting pin 26 will rise, thus shutting off the projecting light when no card is contained in the card holder. This shutter, as shown in Figs. 2 and 3, is located back of the back plate 14. This arrangement of the shutter, and operated as it is by the insertion and withdrawal of the card, insures that the light will project through the film when the card is inserted and that the light will be shut off from the projecting screen when the card is removed.

Provision is made for adjusting the parts of the apparatus that require adjustment. An operating knob 27 provides for raising or lowering or adjusting the projecting device 1 so that the image projected therefrom onto the screen will be properly adjusted (the details of the adjusting mechanism being omitted). Provision is made for adjusting the mirror 3 somewhat by means of the adjusting screws or bolts 41 and rubber washers 29 by which the mirror 3 and its support 28 are secured to the pivoted door 5, as illustrated in Fig. 7. The screen frame 6 is pivotally mounted at the bottom on the cross frame member 31 by pins 30 extending into openings in the cross member; and the top of the screen frame 6 can be moved and adjusted to obtain the proper angle and then fastened in place by the locking screws 32.

In the operation of the viewer illustrated, a pile or stack of cards to be viewed is conveniently placed on the working table or shelf 15 at a height convenient for the operator. A card is readily removed from the pile and inserted in the card holding elements by placing it in the location indicated in broken lines in Fig. 1 and then pushing it down into the card holder. As the card is pushed down, it pushes the spring-pressed plate 17 away from the front plate 13 and is yieldably held between this spring-pressed plate and the front plate as it is being forced down and after it is in final position for viewing. The card will be properly centered as to length by the end members 22 and will be forced down until the bottom of the card is supported by the bottom members 22, best shown in Fig. 3, at which time the card will have the position indicated in broken lines in Fig. 3 and the film will be properly positioned with reference to the openings in the front plate 13 and the spring plate 17 so that light can be projected therethru. The pressure plate 17 insures that the card, when inserted, will have the film located in the proper predetermined focal plane for which the lens of the projector has been focused. The pressure will not be sufficient to interfere with the inserting and removal of the cards since only slight pressure is required to hold the card in proper position.

Before a card is inserted, the shutter member 23 will be lowered and the light will not pass through the openings in the card holding members and will not be projected onto the screen. When, however, a card is inserted in the card holder, the shutter will be raised to permit projection, and when the card is removed, the shutter will be again lowered to shut off the light. Even when the card is fully inserted, it will project somewhat above the edge of the front plate 13 so that it can be readily grasped to permit its withdrawal.

The construction and arrangement of the viewer is such that an operator, sitting in a chair in front of the viewer, will have the cards on the table or shelf 35 at a convenient level and the viewer will be immediately in front of the operator so that successive cards can be inserted and viewed and removed rapidly and selection made of any desired cards for further study or use. The shutting off of the light when a card is removed protects the operator from the glare of light on the screen without interfering with the projection of the film when a card is inserted in the viewer.

It is sometimes desirable to obtain a larger scale projection that that on the translucent screen 4. The present apparatus provides for this by opening the pivoted door 5 at the back of the viewer so that projection takes place directly through this opening onto a screen or wall located at a distance. Such an arrangement is shown conventionally in Fig. 8 with the projection of the film onto a wall or screen 45 located at a distance. By closing the swinging opening 5, the projection will be reflected back by the mirror 3 onto the translucent screen 6.

The improved apparatus of the present invention can also be used for reproducing the films on an enlarged scale. For example, a microfilm having a page of a book or a copy of a letter or a page of a typewritten report, etc., thereon can be enlarged and viewed by the use of the viewer shown in Figs. 1 and 8 using the translucent screen 4 or projecting rearwardly onto a wall or screen 45.

When it is desired, however, to make a reproduction of the material on the film, for example of the page corresponding to the size of the page of the original book or of an original letter or page of a typewritten report, this can readily be accomplished by replacing the translucent screen 6 with a holder for photographic paper. In this case, the translucent screen 4 will be removed and the holder for photographic paper inserted. Different arrangements of photographic paper holding and feeding devices can be used, including continuous rolls of sensitized paper supplied by a roll and with successive portions exposed to reproduce successive films. One form of film holding device is shown in Fig. 9 in the form of a film pack 50. In this arrangement the microfilm on the card will be projected and reflected by the back mirror 3 onto a film of the film pack. As successive exposures are made of successive films, the sensitized paper sheets of the film pack will be successively exposed and a number of enlargements thus made on the films of a single film pack and these films on development will give enlargements of the microfilms on the cards. For such purposes the light can be cut off after exposure, and turned on again for the following exposure, after another card has been inserted.

One type and shape of punched cards used in classification systems is indicated in outline in Figs. 1 and 3. A modified form and arrangement of card is shown in Fig. 10, this card 51 having openings 52 around its edges for classification purposes and being a card of the type used in the so-called McBee Keysort system. This card has two openings 53 and 54 with transparent inserts, such as films, 55 therein having the same general location with reference to the bottom and side of the card, or the top and opposite side of the card, to that of the opening in the card shown in Figs. 1 and 3. These inserts 55 are secured in place by thin layers of adhesive paper 56 overlapping the edges of the inserts and the surrounding card, as shown, and as described in said prior application Serial No. 638,785. Such a card, with openings and inserts so located, can be used in place of the card shown in Figs. 1 and 3 and by turning the card the films can be successively projected or viewed or reproduced. It will be evident that the particular location of the openings and films in the cards can be varied and that two or more openings may be provided in the same card, each having microfilms and the like therein, for example, cards with openings and microfilms located adjacent to each of the four corners. The particular location of the openings in the card holding plates 13, 14 and 17 can be correspondingly moved or varied for cards with films to be projected therefrom.

It will be evident, also, that films of different sizes can be inserted in openings of corresponding size in the cards; and that the viewer can be used with cards having openings and films therein, varying in shape, so long as the location of the film area is within the area of the openings in the card holding plates. The size of the openings and films therein may vary, e. g., from a size corresponding to that of 16 mm. film to a larger size of e. g. 1″ x 1″ approximately, or 1⅞″ x 1¾″ approximately. A series of two or more frames of e. g. a 16 mm. film can be inserted in a single opening in a card and projected for viewing or reproduction by the apparatus of the present invention.

The size of the translucent screen can also be varied but is conveniently a size of e. g. 14″ x 14″ to provide for a projection of the microfilm to a size which makes the printed matter thereon readily legible or reproducible by printing of a legible size.

While the viewer illustrated in Fig. 1 is a floor model with a viewer structure having its own support, that illustrated diagrammatically in Fig. 8 is a table model adapted to be supported on an ordinary table. In either case, the operator seated in front of the viewer, can, with a minimum of effort and motion, place the cards in the viewer, observe them in front of him on the screen, and remove the cards and do this rapidly, so that a large number of cards can be readily viewed and selection made of those of interest.

Similarly, where enlargements are desired, a series of cards can similarly be inserted in the apparatus and projected on the sensitized film, and successive cards so inserted and projected with change of the photographic film or paper on which the enlargement is printed and with a minimum of effort on the part of the operator.

It will also be seen that the present invention provides special card holding, centering and positioning devices for insuring that the card having the microfilm or the like therein will be properly positioned and maintained in the proper focal plane by a special spring-pressed arrangement of the holding plates, etc.

I claim:

1. A viewer for viewing microfilms and the like mounted in openings in cards, including a housing for the viewer, a generally horizontal front shelf for supporting the cards at the front of the housing, a rearwardly directed projector located below the shelf, light reflecting means at the back of the housing, a translucent screen at the front of the housing above and back of the shelf, and card holding plates extending from adjacent the back edge of the shelf downwardly into the path of the projector, the card holding plates being suitably spaced from one another to hold a card in proper position and facilitate insertion of a card between them, whereby cards may be moved from said shelf and inserted between the plates, said plates having openings therein located in the path of the projector and corresponding to the location of the film, etc. in the card when inserted between them, whereby when a card is inserted in position between the card holding plates subject matter on the film, etc., carried thereby may be projected onto said light reflecting means and reflected by it onto the translucent screen.

2. A viewer for viewing microfilms and the like mounted in openings in cards, including a housing for the viewer, a generally horizontal front shelf for supporting the cards at the front of the housing, a rearwardly directed projector located below the shelf, a mirror at the back of the housing, a translucent screen at the front of the housing above the back of the shelf, card holding plates located at the back of the shelf and extending downwardly into the path of the projector, the card holding plates being suitably spaced from one another to hold a card in proper position and facilitate insertion of a card between them and having openings therein for the projection of light therethrough, a movable shutter normally positioned to intercept the projected light when no card is in position between the card holding plates, a movable member extending into the path of movement of a card being inserted between said plates, said member being so operatively connected to the shutter that movement thereof caused by insertion of a card into position between the card-holding plates will cause movement of the shutter to permit projection of the light through said openings and through a correspondingly located film, etc., in the card.

3. A viewer for viewing microfilms and the like mounted in openings in cards, including a housing for the viewer, a generally horizontal front shelf for supporting the cards at the front of the housing, a rearwardly directed projector located below the shelf, a mirror at the back of the housing mounted on a pivoted door at the back of the housing, a translucent screen at the front of the housing above and back of the shelf, card holding plates located at the back of the shelf and extending downwardly into the path of the projector, the card holding plates being suitably spaced from one another to hold a card in proper position and facilitate insertion of a card between them and having openings therein corresponding to the location of the projector, the location of the mirror and door being such that when the door is closed the projector will project the enlarged film, etc. onto the mirror and the mirror will reflect it onto the translucent screen at the front of the housing, and, when the door in the back of the housing is opened, will project the enlarged film, etc. through the back of the housing, onto a surface located at a distance therefrom.

4. A viewer such as defined in claim 1 in which the card holding devices are made up of two card receiving plates spaced apart a distance sufficient to permit the insertion of a card therebetween and having means for holding the card in proper position therebetween, one of said plates having an opening therein for the projection of light therethrough, the other plate having a larger opening therein and a smaller plate inserted in said opening, said smaller plate having an opening corresponding to that of the first plate for projecting light therethrough, and springs for holding said inserted plate yieldably against the first plate, whereby, when a card is inserted between said plates it will be held yieldably to maintain the film therein in a predetermined focal plane.

5. A viewer such as defined in claim 1 in which the card holding devices are made up of two card receiving plates spaced apart a distance sufficient to permit the insertion of a card therebetween and having means for holding the card in proper position therebetween, one of said plates having an opening therein for the projection of light therethrough, the other plate having a larger opening therein and a smaller plate inserted in said opening, said smaller plate having an opening corresponding to that of the first plate for projecting light therethrough, and springs for holding said inserted plate yieldably against the first plate, whereby, when a card is inserted between said plates it will be held yieldably to maintain the film therein in a predetermined focal plane, said plates having channels therein extending downwardly to the openings to protect the films in the cards when inserted therein and removed therefrom.

6. A viewer for viewing microfilms and the like mounted in openings in cards, including a housing for the viewer, a projector for projecting the microfilm etc. from the card onto a screen, a card holding device for holding a card with the film, etc., in a position to be projected, and a movable shutter normally positioned to intercept light from the projector when no card is in position in the card-holding device, a movable member extending into the path of movement of a card being inserted in the card-holding device, said member being so operatively connected to the shutter that movement thereof caused by insertion of a card into position in the card-holding device will cause movement of the shutter to permit light from the projector to be projected through a film etc. in the card, said shutter being movable when a card is removed from the card-holding device to again intercept light from the projector.

7. A viewer for viewing microfilms and the like mounted in openings in cards, including a housing for the viewer, a front shelf for supporting the cards at the front of the housing, a rearwardly directed projector located below the shelf, a mirror at the back of the housing, a translucent screen at the front of the housing above and back of the shelf, card holding devices located at the back of the shelf and below the screen and extending downwardly into the path of the projector and having openings therein corresponding to the location of the projector, a shutter normally preventing projection of light onto the screen when a card is absent from said card holding device and being operated by a card when inserted therein to permit projection therethrough and through the film, etc., in the card, and said card holding device having means for centering the card therein and a spring-pressed plate to hold the card with the film in predetermined focal plane when the card is inserted therein.

8. An apparatus for printing enlargements for microfilms and the like mounted in openings in opaque cards, including a housing, a front shelf for supporting the cards at the front of the housing, a rearwardly directed projector located below the shelf, a mirror at the back of the housing, means for holding photographic paper, etc., at the front of the housing above and back of the shelf, card holding devices located at the back of the shelf and extending downwardly into the path of the projector and having openings therein corresponding to the location of the projector for projecting the microfilm, etc., when a card is inserted therein, and a shutter normally cutting off the light of the projector when a card is ab-sent from said holder and operable by a card when inserted therein to permit projection of the film, etc., onto said photographic paper, etc.

9. A viewer for viewing microfilms and the like mounted in openings in cards, including a housing for the viewer, a projector for projecting the microfilm, etc., from the card onto a screen, a card-holding device for holding a card with the film, etc., in a position to be projected, and a pivoted shutter normally positioned to intercept light from the projector when no card is in position in the card-holding device, an extension extending from the shutter, a member carried by said extension and normally positioned in the path of movement of a card being inserted in the card-holding device, whereby when a card is inserted into position in the card-holding device the shutter will be moved from its normal position to permit light from the projector to be projected through a film etc. in the card, said shutter being movable, when a card is removed from the card-holding device, to again intercept light from the projector.

10. A viewer such as defined in claim 1 wherein the card holding plates have diverging upper edge portions to facilitate insertion of a card between them.

11. A viewer such as defined in claim 1 including a smaller plate mounted in the opening in one of said card holding plates and permitting the transmission of light through said plate openings, and spring means for yieldably urging said smaller plate toward the other of said card holding plates, whereby when a card is inserted between said card holding plates it will be yieldably engaged by said smaller plate to maintain the film therein in a predetermined focal plane.

12. A viewer such as defined in claim 1 including means for positioning a card between the card holding plates with the film in the card opening in alignment with said plate openings, a smaller plate mounted in the opening in one of said card holding plates and permitting the transmission of light through said film and plate openings, and spring means for yieldably urging said smaller plate toward the other card holding plate, whereby when a card is inserted between said plates it will be held yieldably to maintain the film therein in a predetermined focal plane.

JOHN F. LANGAN.

REFERENCES CITED

The following references are of record in the file of this patent:

UNITED STATES PATENTS

| Number | Name | Date |
| --- | --- | --- |
| 724,452 | Edmonds | Apr. 7, 1903 |
| 964,350 | Welsh | July 12, 1910 |
| 1,671,449 | Readeker | May 29, 1928 |
| 1,951,054 | Kennedy | Mar. 13, 1934 |
| 2,015,665 | Eitzen | Oct. 1, 1935 |
| 2,022,903 | Thomas | Dec. 3, 1935 |
| 2,132,716 | Wittel | Oct. 11, 1938 |
| 2,165,250 | George | July 11, 1939 |
| 2,206,206 | Smith | July 2, 1940 |
| 2,322,023 | Hopkins | June 15, 1943 |
| 2,332,810 | Place | Oct. 26, 1943 |
| 2,424,339 | Stechbart et al. | July 22, 1947 |